(12) United States Patent
Frebel et al.

(10) Patent No.: US 8,711,544 B2
(45) Date of Patent: Apr. 29, 2014

(54) HIGH VOLTAGE CIRCUIT FOR ELECTRICAL STIMULATION

(75) Inventors: Fabrice Frebel, Wandre (BE); Bernard Manguette, Stembert (BE)

(73) Assignee: Nouveaux etablissements Charles Martin S.A., Lantin (BE)

( * ) Notice: Subject to any disclaimer, the term of this patent is extended or adjusted under 35 U.S.C. 154(b) by 23 days.

(21) Appl. No.: 13/044,114

(22) Filed: Mar. 9, 2011

(65) Prior Publication Data

US 2011/0220034 A1    Sep. 15, 2011

(30) Foreign Application Priority Data

Mar. 11, 2010  (EP) ..................... 10156155

(51) Int. Cl.
*F41B 15/04* (2006.01)
(52) U.S. Cl.
USPC ........................................... 361/232
(58) Field of Classification Search
USPC .......................................... 119/720; 361/232
See application file for complete search history.

(56) References Cited

U.S. PATENT DOCUMENTS

| | | | | | |
|---|---|---|---|---|---|
| 4,618,919 A | * | 10/1986 | Martin, Jr. | ................. | 363/21.12 |
| 4,667,431 A | * | 5/1987 | Mendicino | ........................... | 43/6 |
| 4,802,482 A | * | 2/1989 | Gonda et al. | ................... | 119/720 |
| 4,817,331 A | * | 4/1989 | Podsiadly et al. | ................ | 47/1.3 |
| 4,868,760 A | * | 9/1989 | Obara | ........................... | 700/162 |
| 4,997,418 A | * | 3/1991 | DeMartini | ....................... | 604/20 |
| 5,418,381 A | * | 5/1995 | Aizawa | ......................... | 250/551 |
| 5,892,389 A | * | 4/1999 | Lai | ................................. | 327/543 |
| 5,962,806 A | * | 10/1999 | Coakley et al. | ................ | 102/502 |
| 6,222,149 B1 | * | 4/2001 | Toyonaga et al. | ........... | 219/69.13 |
| 6,404,613 B1 | * | 6/2002 | Dowling et al. | ............... | 361/232 |
| 7,602,597 B2 | * | 10/2009 | Smith et al. | .................... | 361/232 |
| 7,841,928 B2 | * | 11/2010 | Tseng et al. | .................... | 452/58 |
| 8,324,902 B2 | * | 12/2012 | Burns et al. | .................... | 324/403 |
| 2005/0000469 A1 | * | 1/2005 | Giunta et al. | ................... | 119/721 |
| 2006/0043930 A1 | * | 3/2006 | Koyanagi et al. | .............. | 320/114 |
| 2007/0221139 A1 | * | 9/2007 | Reinhart | ........................ | 119/720 |
| 2007/0278929 A1 | * | 12/2007 | Chen et al. | ..................... | 313/485 |
| 2008/0114415 A1 | * | 5/2008 | Dai et al. | ......................... | 607/54 |
| 2008/0216766 A1 | * | 9/2008 | Martin et al. | .................. | 119/720 |
| 2011/0220034 A1 | * | 9/2011 | Frebel et al. | ................... | 119/720 |
| 2012/0152907 A1 | * | 6/2012 | Chen et al. | .................. | 219/69.13 |

FOREIGN PATENT DOCUMENTS

EP        1 968 359 A1    9/2008
GB        2 000 919 A     1/1979

* cited by examiner

*Primary Examiner* — Ronald W Leja
(74) *Attorney, Agent, or Firm* — Reinhart Boerner Van Deuren P.C.

(57) ABSTRACT

The present invention relates to a remote-receiving circuit (1) for providing and controlling an electric stimulus applied to an animal, the circuit (1) comprising:
- an isolated DC/DC converter (4) having a low voltage input powered by an energy source (3) and a high voltage output connected to a storage capacitor (8) suitable to be charged with stimulus energy by said converter (4);
- a first electrode (5) and a second electrode (6) configured to be in contact with the animal for delivering to it high voltage stimulus current and connected to the respective ends of said storage capacitor (8);
- a current-limiting circuit (9) connected in series with the storage capacitor (8) to control the stimulus current delivered to the animal through the electrodes (5, 6).

15 Claims, 3 Drawing Sheets

HIGH VOLTAGE CIRCUIT FOR ELECTRICAL STIMULATION

FIELD OF THE INVENTION

The present invention relates to a module circuit for controlling an electric stimulus applied to an animal. The stimulus is usually generated by a means such as a collar bearing electrodes and attached to the animal's neck. The collar is typically remote-controlled by radio-frequency means. The intensity of the stimulus through the skin of the animal is preferably variable in order to train the animal.

STATE OF THE ART

Dog handlers often use electrical collars in order to keep control of their dog.

FIG. 1 shows a typical module that generates the electrical stimulus through electrodes EP1 and EP2.

The circuit 1 depicted in FIG. 1 is powered by a low voltage battery 3, typically a 3V-battery, and works in two phases:
- a first phase consists in charging the transformer 4A (TR1) by switching transistor 2 (T1) ON during a quite large amount of time, for example 1 ms. During this time, the current in the primary of the transformer 4A linearly rises due to magnetic energy accumulation in the magnetising inductance (of typically 2 mH) of the transformer. The current can then rise up to a few amperes. For example, the current rises up to 3V×1 ms/2 mH=1.5 A. That means that the transformer 4A has to be able to store a stimulus energy of ½×2 mH×(1.5 A)$^2$=2.25 mJ;
- a second phase consists in transferring the above-mentioned stimulus current to the skin of the animal through electrodes 5 (EP1) and 6 (EP2). When transistor 2 (T1) is switched OFF, the current flowing in the primary winding of the transformer stops but, owing to the inductive laws, a current appears in the secondary of the transformer according to a value related to the transformer ratio of TR1. A typical ratio is 1:10, which yields a typical 150 mA peak current.

The above two phases are periodically repeated as much as several hundred times per second to create the stimulus. Typical repetition frequencies are of the order of 200 Hz.

Prior art has several drawbacks:
- the transformer has to store the energy of each pulse. To store 2.25 mJ, a typical transformer has dimensions of 20 mm×15 mm×15 mm. This is however very large to be integrated in a collar attached to the neck of an animal;
- the primary current is quite high and above what typical batteries 3 (B1) can withstand. Therefore, a large buffer capacitor 7 (C1) has to be added. Typical capacitors are tantalum capacitors of 470 µF. Such capacitors are also quite large. It should be noted that even with a 470 µF buffer capacitor, the battery is still subject to large current pulses;
- the shape of the current cannot be controlled and is mainly determined by the impedance of the skin of the animal. Only the peak current of 150 mA can be controlled by smartly modulating the time duration during which T1 is ON. One invention has been elaborated by the same inventors to be able to control the peak current (see EP 1 968 359 A1). This solves the issue of peak current control but this does not allow full current shape control;
- electrode EP1 has a potential that is positive when T1 is ON and negative when T1 is OFF. This disallows usage of the electrodes for other functions like battery charging. This will be explained below.

Document EP 1 968 359 A1 discloses a remote receiving circuit and a method for verifying the impedance of electrodes and for controlling the intensity of an electric stimulus. The circuit includes an electronic switch powered by a battery in series on a primary of a high-voltage transformer and whose on/off state can be modified by control pulses to create a source of alternating current to supply the primary of the transformer. The circuit further includes a first electrode and a second electrode configured to be in contact with the animal and connected to the respective ends of a secondary of the transformer, and a device for measuring the peak intensity of a stimulus current applied by the electrodes to the animal's body. The circuit further comprises means to adjust the generation of control pulses to the measurement of the peak current.

Application EP 1 968 359 A1 is fully incorporated by reference in the present application.

AIMS OF THE INVENTION

The present invention aims at circumventing the drawbacks of prior art.

In particular the invention aims to provide a device of reduced size for controlling an electric stimulus applied to an animal.

The invention intends also to provide a device suitable to control the shape and the intensity of the stimulus current.

The invention additionally aims at using the electrodes for other functions such as battery charging.

Another aim of the invention is to provide a device as above mith multiple electrodes.

The invention also aims at providing a training collar with means for an easy and/or a high-level parameter setting.

SUMMARY OF THE INVENTION

A first object of the present invention is related to a remote-receiving circuit for providing and controlling an electric stimulus applied to an animal, the circuit comprising:
- an isolated DC/DC converter having a low voltage input powered by an energy source and a high voltage output connected to a storage capacitor suitable to be charged with stimulus energy by said converter;
- a first electrode and a second electrode configured to be in contact with the animal for delivering to it high voltage stimulus current and connected to the respective ends of said storage capacitor;
- a current-limiting circuit connected in series with the storage capacitor to control the stimulus current delivered to the animal through the electrodes.

Moreover, preferred embodiments of the remote-receiving circuit according to the invention include one or an appropriate combination of the following characteristics:
- the energy source is a battery and the isolated DC/DC converter is a flyback converter having a switching transistor operating at a frequency between 20 kHz and 5 MHz;
- the operating frequency of the converter is 200 kHz;
- the size of the flyback converter high frequency transformer is smaller than 5 mm×5 mm×5 mm;
- the high voltage output of the DC/DC converter is limited to 5000V;
- the DC/DC converter has a primary filtering capacitor which is a small ceramic capacitor;
- the high voltage current limiting circuit comprises at least a resistor in series with a second switching transistor;

the second switching transistor is a MOSFET or a BJT transistor;

the resistor is replaced by a specific circuit allowing peak current measurement;

said specific circuit comprises a non-linear shunt and a peak detector;

the gate voltage applied to the second switching transistor is suitable to control the peak amplitude and the shape of the delivered stimulus current;

the circuit comprises an additional diode connecting the secondary to the primary of the flyback transformer and polarized so that to protect the circuit against undesired polarity reversal and suitably to allow charging of the battery;

the current-limiting circuit connected in series with the storage capacitor is located either at the positive terminal side or at the negative terminal side of the stimulus energy storage capacitor, between said terminal and the corresponding electrode respectively;

one of the electrodes is replaced by multiple electrodes, each associated with a specific current limiting circuit respectively, each connected at the negative terminal side of the storage capacitor;

the circuit comprises control means allowing fine stimulus current shape definition by use of an external PC-like device.

Another object of the invention relates to a device for remotely providing and controlling an electric stimulus applied to an animal, the device comprising:

a radiofrequency transmitter configured to emit a remote signal;

a remote-receiving circuit as above configured so as to receive the signal and to provide and control the stimulus depending on the signal received.

SHORT DESCRIPTION OF THE DRAWINGS

FIG. 1, already mentioned, shows a typical prior art electronic circuit for the generation of an electrical stimulus.

DETAILED DESCRIPTION OF THE INVENTION AND PREFERRED EMBODIMENTS

The originality of the present invention lies in the idea of storing the stimulus energy in a capacitor instead of in a transformer and in the addition of a simple high voltage current limiting circuit to control the stimulus.

The present invention allows a tight control of the current meaning that the previous invention of EP 1 968 359 A1 is still fully applicable.

Adding extra electrodes is possible and only requires a limited number of small additional components.

Principle

Figure 1:
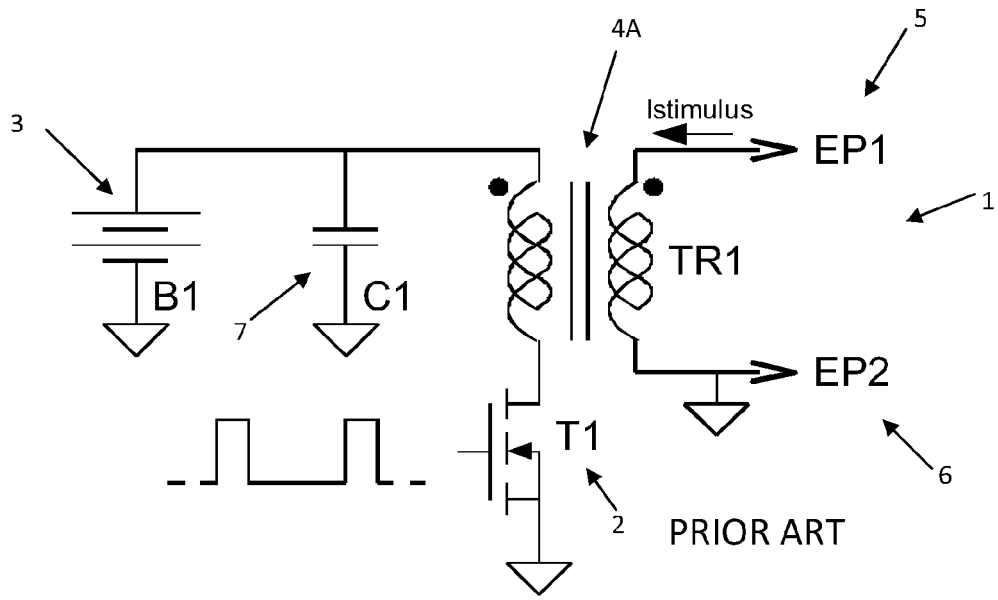
Figure 2:
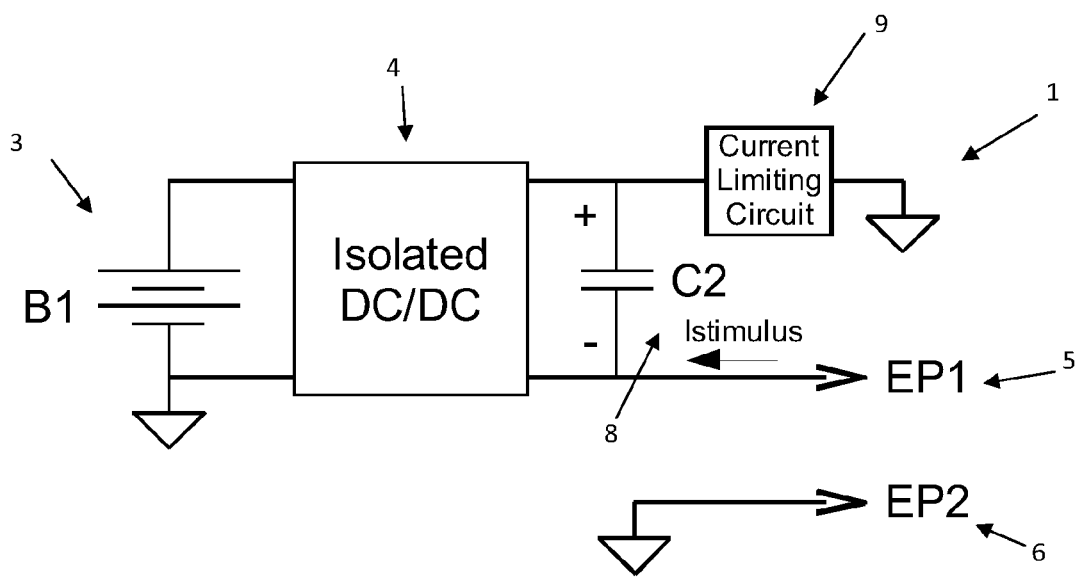
FIG. 2 shows a general block diagram for the circuit of the present invention.

In order to reduce the size of the transformer, the present invention thus proposes to store the energy of the stimulus pulse in a capacitor 8 (called C2) instead of a transformer (see FIG. 2). For the sake of the example, a 4.7 nF / 1000V capacitor can store up to 2.35 mJ but has dimensions of only 4.5 mm×2 mm×2 mm (to be compared with 20 mm×15 mm×15 mm as above).

In order to charge this capacitor 8 to 1000V starting from the 3V battery 3, a classical isolated DC/DC converter 4 is proposed. A flyback converter can be used as a preferred embodiment of a DC/DC converter but other topologies are also possible and would yield the same result. In order to be able to sustain the typical 200 Hz stimulus pulse frequency, the DC/DC converter 4 has to be able to charge the capacitor 8 (C2) in less than 5 ms, let us consider 4 ms.

Using high frequency transformers, it is possible to build a converter working at high frequency, let us consider 200 kHz. That means that the transformer will be able to charge the capacitor in a number of cycles. During 4 ms, if the switching frequency is 200 kHz, the transformer can transfer the energy with 800 cycles. That means that the transformer has only to store $1/800$ of the energy in comparison to the prior art. This can drastically (i.e. by nearly two orders of magnitude) reduce the volume of the transformer. Experiments have shown that it is industrially easy to build such a transformer that has a size smaller than 5 mm×5 mm×5 mm (to be compared with 20 mm×15 mm×15 mm as above). This is a great advantage of the present invention.

It should be noted that the transformer operation at high frequency has another advantage. The primary current pulse can be filtered using a very small ceramic capacitor instead of a large tantalum capacitor as in the prior art.

In order to accurately control the shape of the stimulus current, the present invention additionally proposes to insert a high voltage current limiting circuit 9. The current limiting circuit 9 can be built with classical transistors (MOSFET or BJT). It should be noted that the current limiting circuit should be designed to limit the current to 0 during the charge phase of the capacitor. This allows the high frequency transformer to charge capacitor 8 (C2) very quickly because there is then no load on the converter 4.

Block diagram

The circuit presented in FIG. 2 works as explained in section "Principle" above. There are mainly two phases:

the isolated DC/DC converter 4 charges the capacitor 8 (C2) to a high voltage (for example 1000V). During this phase the current limiting circuit limits the current to 0;

once capacitor 8 (C2) is charged with enough energy, the current limiting circuit is able to generate a well-controlled and shaped current stimulus that is applied to the skin of the animal through electrodes 5 (EP1) and 6 (EP2).

One Typical Detailed Embodiment of the Invention

Figure 3:
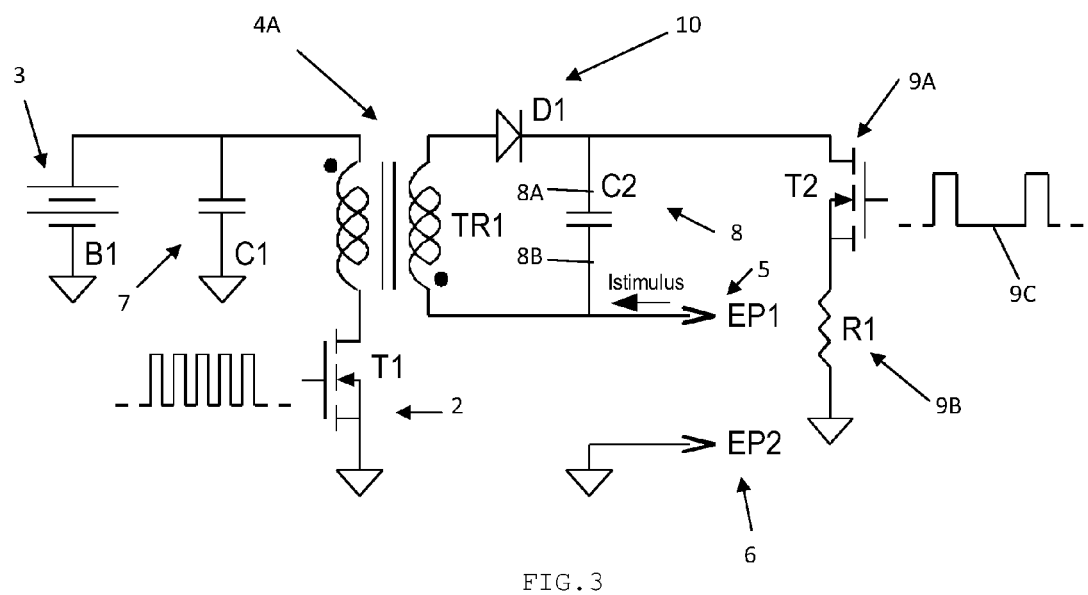
FIG. 3 shows a preferred embodiment corresponding to the block diagram of FIG. 2

FIG. 3 shows a typical embodiment according to the block diagram presented in FIG. 2.

The isolated DC/DC converter 4 is made of the input decoupling capacitor 7 (C1), the main switcher 2 (T1), the isolation transformer 4A (TR1), the rectifier 10 (D1) and the output decoupling and storage capacitor 8 (C2). It should be noted that C1 and TR1 are smaller (by one or two orders of magnitude) than C1 and TR1 of the above-mentioned prior art. Even if the presented invention needs more components than the prior art (D1, C2, T2 and R1), these components are very small and the overall size of the presented invention is clearly smaller than the overall size of a prior art circuit.

The stimulus energy is stored in C2.

Preferably, the current limiting circuit 9 is made of a switching transistor 9A (T2) and a resistor 9B (R1). This is a classical current limiting circuit that limits the current to:

$$I_{stimulus} = (Vg - Vgs(th))/R1, \quad (1)$$

where Vg is the gate voltage 9C applied to T2 and Vgs(th) is the threshold voltage of T2.

R1 is a simple resistor but it can be advantageously replaced by a more sophisticated circuit that allows peak current measurement, for example the dedicated circuit portion as described in EP 1 968 359 A1.

Examples for transistors T1 and T2 are MOSFET transistors but these can be replaced by other transistor technologies.

It should be noted that the pulse train controlling T1 is a high frequency pulse train that is different from that of the prior art. The effective stimulus control is performed with the gate voltage applied to T2.

Equation (1) shows that $I_{stimulus}$ is perfectly controlled with Vg. The duration, the peak amplitude and the shape of $I_{stimulus}$ are tightly controlled with Vg. For example, it is possible to generate high and narrow or low and wide stimulus pulses. This was obviously not possible in prior art.

Battery Charging Variant

It can be proved that the voltage at electrode 5 (EP1) is always negative or null. This yields the opportunity to give an auxiliary functionality to electrodes 5 (EP1) and 6 (EP2). It is possible to charge the battery by applying a low voltage source between EP1 and EP2. The circuit variation is shown in FIG. 4.

Diode 11 (D3) does not affect the normal operation of the circuit because it is always reverse polarized. However, when T1 and T2 are maintained in the off state, applying a positive voltage between EP1(+) and EP2(−) creates a current through D3 that is suitable to charge battery 3 (B1).

Figure 4:
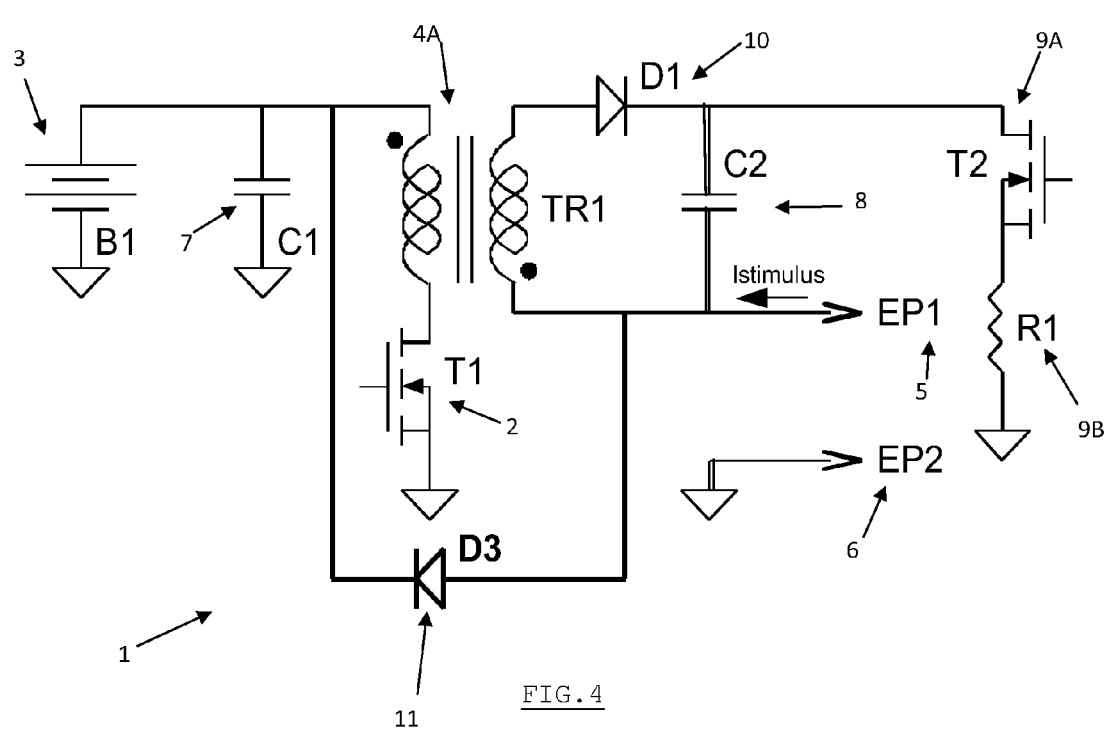
FIG. 4 depicts the circuit of FIG. 3 with an added diode allowing battery charging.

It should be noted that the circuit of FIG. 4 has an additional interesting property. If the voltage source applied to electrodes EP1 and EP2 for battery charging is wrongly connected (reverse polarity), diodes D1 and D3 are reverse polarized, no current flows through the electrodes and the circuit of FIG. 4 cannot be damaged. This is a "natural" reverse polarity protection.

Variant of the Position of the Current Limiting Circuit

In the block diagram of FIG. 2, the current limiting circuit is connected to the positive side 8A of C2. It is however not mandatory to do so because the only requirement for the current limiting circuit 9 is to be in series with C2. Connecting the current limiting circuit to the negative side 8B of C2 yields the circuit of FIG. 5 below.

The isolated DC/DC converter and the current limiting circuit of the invention in this embodiment can be implemented in the same way the block diagram of FIG. 2 has been implemented in the circuit of FIG. 3.

Figure 5:
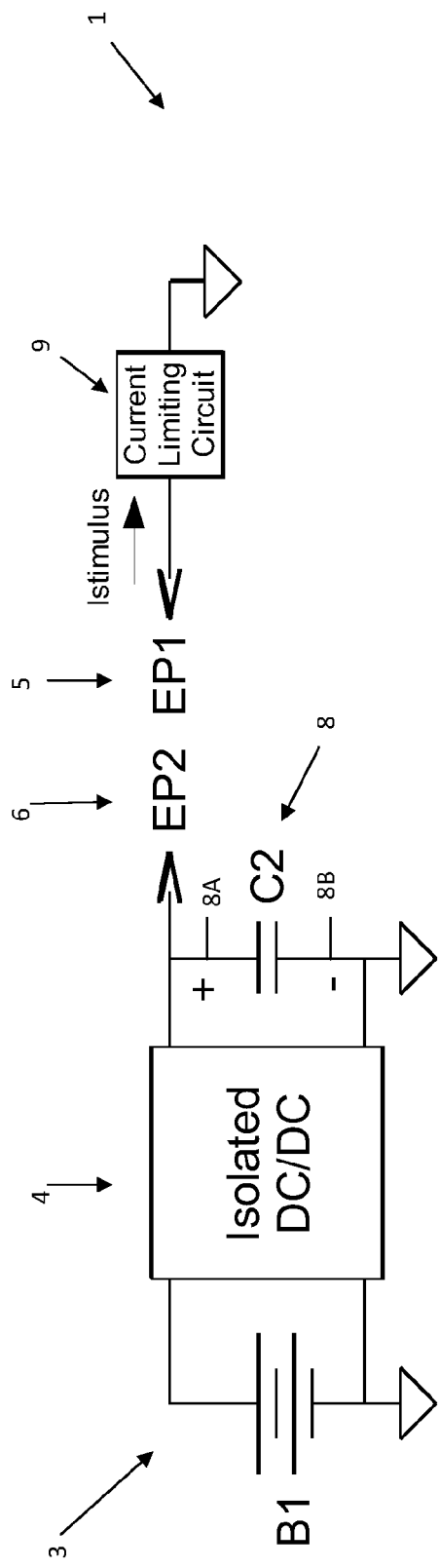
FIG. 5 shows a variation of the block diagram of FIG. 2 with the current limiting circuit connected in an alternative way.

It should be noted that the block diagram of FIG. 5 does not allow the battery to be charged using EP1 and EP2. However, connecting the current limiting circuit in that way allows several current limiting circuits to be implemented as shown in the next section (FIG. 6).

Multiple Electrodes Stimulation Variant

The present invention allows to generate the stimulus in different positions of the device on the skin of the animal by simply using multiple electrodes 15, 25, coupled with corresponding current limiting circuits 19, 29, 39, respectively. The main difference with the prior art is that adding electrodes only requires additional current limiting circuits but no additional transformer.

Figure 6:
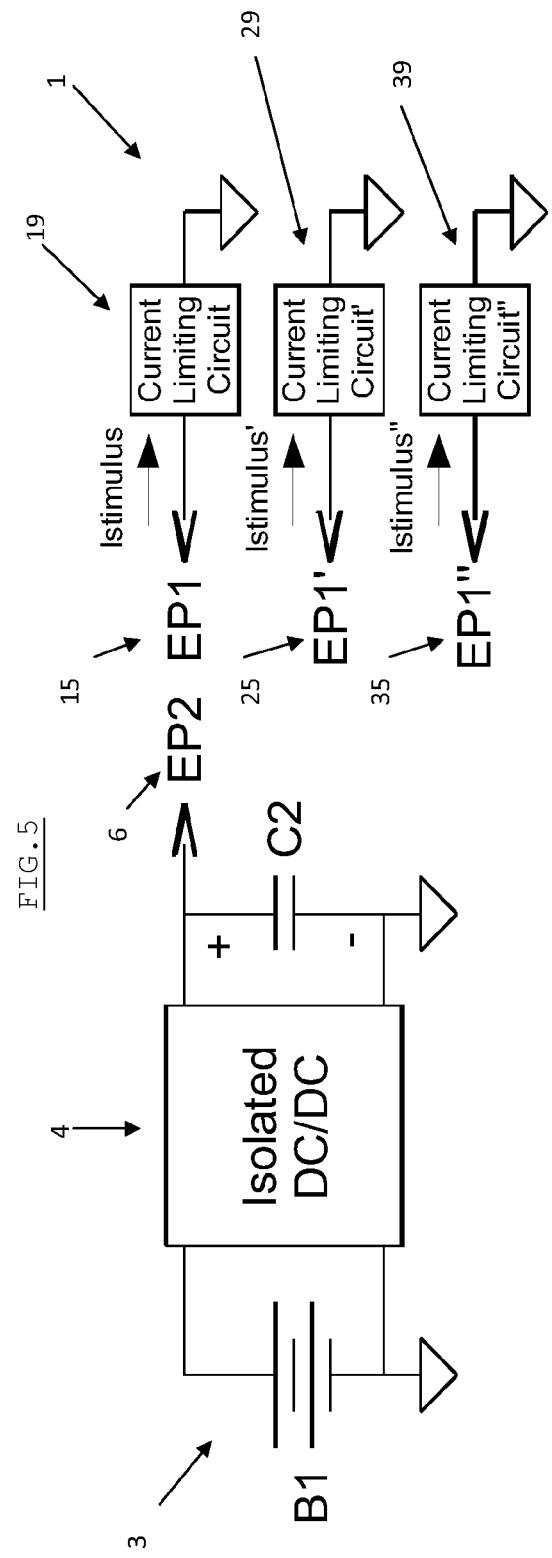
FIG. 6 shows a block diagram as in FIG. 5 but having three electrodes instead of one.

FIG. 6 illustrates a manner to generate the stimulus through three different electrodes 15, 25, 35 with only one transformer 4A. The size of the circuit is therefore kept very small in comparison to the prior art that would instead require three transformers.

Advantageously, according to the invention, the three current limiting circuits 19, 29, 39 can be controlled individually. This type of circuit allows an incredible number of ways to generate various stimuli.

Setting of Stimulus Current Parameters

As shown by equation (1), the present invention allows a high degree of control of the shape of the stimulus current. That means that it is possible to define a lot of different stimulation shapes with a lot of different parameters. In the context of dog education, this allows the handler to adapt the stimulus current to his dogs and to his dressage methods.

It is known that an experienced man like a dog trainer would be eager to change the sensation of the stimulation. Each dog needs a different stimulation owing to his sensibility, would it be physical or physiological. One can change the thickness of the stimulation, the amplitude, the frequency, etc.

It is also a purpose of the present invention to adapt these parameters with the help of a PC-like device, for example a PC, a laptop, a PDA, a Netbook, an i-phone, etc. The communication channel between the PC-like device and the collar to be parameterized can be made with a protocol translation device (USB to radio-frequency for example).

In addition, the handler can also change the way the stimulations are distributed. For example, he can decrease the amplitude of the lowest stimulation (to start with a lower stimulation) or increase the amplitude of the highest stimulation.

Moreover, the invention allows a late configuration of the collar by specialists. The collar is initially manufactured with default stimulations parameters (restricted to lower levels) but higher levels are accessible to advised persons like a veterinary, a professional in dog training, etc.

This solves the problem of animal welfare by only giving access to higher levels to professionals or to people who followed a dedicated training.

From the collar manufacturer side, the advantage is that the latter only has to manufacture one product that can serve both usages (consumer and professional), while preserving the animal welfare in all cases.

By this way, other parameters can be changed like frequency of the buzzer, intensity of vibration, etc.

The invention claimed is:

1. A remote-receiving circuit (1) for providing and controlling an electric stimulus applied to an animal, the circuit (1) comprising:

an isolated DC/DC converter (4) having a low voltage input powered by an energy source (3) and a high voltage output connected to a storage capacitor (8) suitable to be charged with stimulus energy by said converter (4);

a first electrode (5) and a second electrode (6) configured to be in contact with the animal for delivering to it high voltage stimulus current and connected to the respective ends of said storage capacitor (8);

a high-voltage current-limiting circuit (9) connected in series with the storage capacitor (8) to control the stimulus current delivered to the animal through the electrodes (5, 6), said high-voltage current-limiting circuit (9) comprising at least a resistor (9B) in series with a switching transistor (9A), so that in a first phase, the isolated DC/DC converter (4) charges the storage capacitor (8) to a high voltage, while the current-limiting circuit (9) limits to zero the stimulus current delivered to the animal through the first and second electrodes (5, 6); and in a second phase, while the storage capacitor (8) is discharging, the current-limiting circuit (9) generates a low-frequency pulsed stimulus current delivered to the animal through the first and second electrodes (5, 6), said current being controlled in duration, peak amplitude and shape.

2. The circuit of claim 1, wherein the energy source (3) is a battery and the isolated DC/DC converter (4) is a flyback converter having a switching transistor (2) operating at a frequency between 20 kHz and 5 MHz.

3. The circuit of claim 2, wherein the operating frequency of the converter is 200 kHz.

4. The circuit of claim 2, wherein the size of the flyback converter high frequency transformer (4A) is smaller than 5 mm×5 mm×5 mm.

5. The circuit of claim 2, wherein the flyback converter includes a flyback transformer with an additional diode (11) connecting a secondary of the flyback transformer to the primary of the flyback transformer (4A) and polarized so that to protect the circuit against undesired polarity reversal and suitably to allow charging of the battery (3).

6. The circuit of claim 1, wherein the high voltage output of the DC/DC converter (4) is limited to 5000V.

7. The circuit of claim 1, wherein the DC/DC converter (4) has a primary filtering capacitor (7) which is a small ceramic capacitor.

8. The circuit of claim 1, wherein the current-limiting circuit (9) connected in series with the storage capacitor (8) is located either at the positive terminal (8A) side or at the negative terminal (8B) side of the stimulus energy storage capacitor (8), between said terminal (8A, 8B) and the corresponding electrode (6, 5) respectively.

9. The circuit of claim 8, wherein one of the electrodes (5) is replaced by multiple electrodes (15, 25, 35), each associated with the specific current limiting circuit (19, 29, 39) respectively, each connected at the negative (8B) terminal side of the storage capacitor (8).

10. The circuit of claim 1, wherein the high voltage current limiting circuit comprises said at least a resistor in series with said switching transistor to deliver low frequency current pulses of controlled duration, peak amplitude and shape.

11. The circuit of claim 1, wherein the high voltage current limiting circuit comprises said at least a resistor (9B) in series with said switching transistor (9A) and means for controlling the switching transistor, so that the switching transistor delivers low-frequency stimulus current pulses of controlled duration, peak amplitude and shape.

12. The circuit of claim 11, wherein said means for controlling the switching transistor comprise means for generating a gate voltage Vg (9C) applied to the switching transistor (9A), so that the stimulus current is limited to (Vg−Vg(th)/R1, wherein Vg(th) is the threshold voltage of the switching transistor (9A) and R1 is the resistor (9B) in series with the switching transistor (9A).

13. The circuit of claim 1, wherein the switching transistor (9A) is a MOSFET or a BJT transistor.

14. The circuit of claim 13, wherein the gate voltage (9C) applied to the switching transistor (9A) is suitable to control the peak amplitude and the shape of the delivered stimulus current.

15. The circuit of claim 1, wherein the high voltage current limiting circuit comprises a non-linear shunt and a peak detector.

\* \* \* \* \*